(12) United States Patent
Aglan

(10) Patent No.: US 9,034,426 B2
(45) Date of Patent: May 19, 2015

(54) NANOSTRUCTURED THERMOPLASTIC POLYIMIDE FILMS

(71) Applicant: TUSKEGEE UNIVERSITY, Tuskegee, AL (US)

(72) Inventor: Heshmat Aglan, Tuskegee, AL (US)

(73) Assignee: Tuskegee University, Tuskegee, AL (US)

( * ) Notice: Subject to any disclaimer, the term of this patent is extended or adjusted under 35 U.S.C. 154(b) by 0 days.

(21) Appl. No.: 13/678,914

(22) Filed: Nov. 16, 2012

(65) Prior Publication Data

US 2013/0131266 A1 May 23, 2013

Related U.S. Application Data

(60) Provisional application No. 61/561,636, filed on Nov. 18, 2011.

(51) Int. Cl.
| | |
|---|---|
| *B05D 3/12* | (2006.01) |
| *C08K 3/04* | (2006.01) |
| *C08J 3/205* | (2006.01) |
| *C08K 7/24* | (2006.01) |
| *B82Y 30/00* | (2011.01) |
| *B05D 1/00* | (2006.01) |

(52) U.S. Cl.
CPC ............... *C08K 3/04* (2013.01); *Y10S 977/742* (2013.01); *B82Y 30/00* (2013.01); *B05D 1/005* (2013.01); *C08J 3/205* (2013.01); *C08K 7/24* (2013.01); *C08J 2379/08* (2013.01); *C08K 2201/011* (2013.01); *Y10S 977/752* (2013.01); *Y10S 977/753* (2013.01)

(58) Field of Classification Search
CPC . B05D 1/005; Y10S 977/742; Y10S 977/752; C08K 3/04; B82Y 30/00
USPC ............... 427/240, 377, 385.5; 977/742, 752, 977/753; 524/592
See application file for complete search history.

(56) References Cited

U.S. PATENT DOCUMENTS

| | | | | |
|---|---|---|---|---|
| 5,662,279 | A | * | 9/1997 | Czekai et al. .................... 241/21 |
| 2004/0071990 | A1 | * | 4/2004 | Moriyama et al. ............ 428/458 |
| 2008/0258117 | A1 | * | 10/2008 | Sakakibara et al. .......... 252/582 |
| 2012/0292563 | A1 | * | 11/2012 | Vogel et al. ............. 252/182.24 |
| 2013/0015411 | A1 | * | 1/2013 | Kang et al. .................... 252/511 |

FOREIGN PATENT DOCUMENTS

| | | | |
|---|---|---|---|
| KR | 10-1004428 | * | 12/2010 |
| WO | WO 2011/086049 | * | 7/2011 |

* cited by examiner

*Primary Examiner* — Kirsten Jolley
(74) *Attorney, Agent, or Firm* — Hogan Lovells US LLP

(57) ABSTRACT

Structured films containing multi-walled carbon nanotubes ("MWCNTs") have enhanced mechanical performance in terms of strength, fracture resistance, and creep recovery of polyimide ("PI") films. Preferably, the loadings of MWCNTs can be in the range of 0.1 wt % to 0.5 wt %. The strength of the new PI films dried at 60° C. increased by 55% and 72% for 0.1 wt % MWCNT and 0.5 wt % MWCNT loadings, respectively, while the fracture resistance increased by 23% for the 0.1 wt % MWCNTs and then decreases at a loading of 0.5 wt % MWCNTs. The films can be advantageously be created by managing a corresponding shift in the annealing temperature at which the maximum strength occurs as the MWCNT loadings increase.

1 Claim, 6 Drawing Sheets

*Effects of solvents on the ultimate strength of neat PI films*

| Formulations | Peak stress (MPa) | Strain to failure (%) | Comments |
|---|---|---|---|
| 100% NMP/PI | 91 | 10.5 | More flexible |
| 100% THF/PI | 50 | 5.5 | Brittle |
| 50% THF/50%NMP | 21 | 8 | Less flexible |

Summary of mechanical properties of neat and nanostructured films

| Samples | Strength (MPa) | Residual strength (MPa) | $K_1$ (MPa$\sqrt{m}$) |
|---|---|---|---|
| Neat | 46 ± 3.6 | 35.6 | 3.05 ± 0.10 |
| 0.1% MWCNT | 73 ± 2.6 | 41.2 | 3.75 ± 0.30 |
| 0.5% MWCNT | 81 ± 2.7 | 38.7 | 3.66 ± 0.50 |

FIG. 2A

Summary of annealing study measured at ambient temperature

| Samples | Temperature (°C) | Strain rate (%/min) | Viscosity (Pa.s) | Percentage recoverable strain |
|---|---|---|---|---|
| Neat PI | 25 | 0.00602 | $1.83 \times 10^{13}$ | 90.81 |
| | 100 | 0.00657 | $1.25 \times 10^{13}$ | 91.02 |
| | 200 | 0.01320 | $3.06 \times 10^{12}$ | 86.26 |
| 0.1% MWCNT-PI | 25 | 0.00472 | $3.10 \times 10^{13}$ | 93.67 |
| | 100 | 0.00507 | $2.10 \times 10^{13}$ | 90.10 |
| | 200 | 0.01487 | $2.47 \times 10^{12}$ | 85.27 |
| 0.5% MWCNT-PI | 25 | 0.00329 | $5.01 \times 10^{13}$ | 94.28 |
| | 100 | 0.00643 | $1.30 \times 10^{13}$ | 87.80 |
| | 200 | 0.02080 | $1.23 \times 10^{12}$ | 90.38 |

FIG. 2B

Summary of the creep properties of PI films at various temperatures.

| Properties | | 60°C | 150°C | 210°C | 250°C |
|---|---|---|---|---|---|
| Tensile strength (MPa) | Neat PI | 46.4 ± 3.60 | 85.3 ± 4.18 | 101 ± 3.12 | 113 ± 6.39 |
| | 0.1% NT | 73 ± 2.60 | 90 ± 8.67 | 147 ± 0.50 | 117 ± 7.50 |
| | 0.5% NT | 81 ± 2.70 | 102 ± 2.50 | 95 ± 4.30 | 96 ± 6.40 |
| Strain to failure (%) | Neat PI | 10.5 ± 1.5 | 13.5 ± 1 | 6.8 ± 0.8 | 8.7 ± 0.9 |
| | 0.1% NT | 6.7 ± 0.9 | 10.5 ± 0.9 | 7.5 ± 0.8 | 7.5 ± 0.5 |
| | 0.5% NT | 6.7 ± 0.9 | 9.6 ± 0.8 | 5.9 ± 0.9 | 6.1 ± 0.5 |
| Fracture resistance (MPa√m) | Neat PI | 3.06 ± 0.10 | 4.79 ± 0.37 | 3.73 ± 0.13 | 3.34 ± 0.27 |
| | 0.1% NT | 3.75 ± 0.30 | 4.58 ± 0.32 | 3.57 ± 0.19 | 3.36 ± 0.16 |
| | 0.5% NT | 3.66 ± 0.50 | 4.4 ± 0.34 | 3.69 ± 0.48 | 3.09 ± 0.03 |

NANOSTRUCTURED THERMOPLASTIC POLYIMIDE FILMS

RELATED APPLICATIONS

This application claims priority to U.S. provisional application 61/561,636, filed on Nov. 18, 2011, which is herein incorporated by reference in its entirety.

STATEMENT REGARDING FEDERALLY SPONSORED RESEARCH OR DEVELOPMENT

This invention was made with government support under contract number DE-FG52-05NA27039 awarded by the Department of Energy. The U.S. government has certain rights in the invention.

FIELD OF THE INVENTION

The present invention relates to the use of multi-walled carbon nanotubes to improve the mechanical performance and properties of polyimide films. More particularly, the inventions disclosed herein relate to improved methods for fabricating nanostructured films, which methods produce films having superior characteristics.

BACKGROUND OF THE INVENTION

Polyimides ("PIs") have excellent properties in comparison to other polymers. They have remarkable heat-resistant properties [1]. Also, PIs have exceptional mechanical strength, flexural modulus, toughness, chemical resistance, and good adhesion to various substrates [2]. In addition, they also have a low coefficient of thermal expansion, which allows them to be used in high-temperature applications [3]. These excellent properties of PIs can be attributed to the strong intermolecular forces between the polymer chains. Also, PIs have the ability to form hydrogen bonds due to partially positive hydrogen in the imide groups and partially negative oxygen on carbon double bonds, which will attract each other and form hydrogen bonds. Hydrogen bonds are stronger bonds than bonds from van der Waals forces. The phenylene ring structure also contributes to the strength and stiffness of PIs because the ring lacks the flexibility of single bonds. PIs are widely used in the electronic industry for various applications ranging from displays in computers and other digital devices to high-temperature adhesives in the semiconductor field and flexible insulated cables [4]. PIs are used to make mechanical and electrical parts in the automotive industry such as pumps, bearings, seals, valve seats, oil filter seals, retainer, piston rings, sensors/solenoids, relays, switches, ignition coils, etc. [5,6]. A more recent application of PIs is as substrates for solar cells and solar concentrators [7-15]. This is due to their good flexibility, mechanical strength, chemical resistance, and transparency.

Pristine PIs have many applications as mentioned previously. However, to serve in these applications more effectively, the properties of PIs need to be enhanced. Some of these applications include their use in electronics where the material needs to be electrically and thermally conductive. Other applications require PI with high strength, fracture resistance, creep resistance, and thermal stability, which the pristine material may not possess. These properties can be obtained by developing a nanostructured PI system. Nanostructured polymers are materials composed of a polymer in which nanoparticles (size ranging from 1 to 100 nm) [16] are incorporated to enhance the properties of the pristine polymer. One of the advantages of developing nanostructured polymers over the pristine polymer is that the properties of the nanostructured polymer can be tailored for specific applications. Other advantages include low cost, high strength, lightweight, ease of manufacturing compared to metals or ceramics, etc. In addition, small particles such as nanoparticles can induce crystallization by creating more crystallization sites than would larger particles [17]. An increase in crystallinity will increase properties, such as strength, modulus of elasticity, and thermal resistance. One important aspect that must be addressed when developing nanostructured polymeric systems is the choice of a suitable nano-reinforcement that is compatible with the polymer of choice. Additionally, the nano-reinforcement must possess excellent properties in order to improve the properties of the polymer with which it is combined.

Nanostructured polymeric systems and coatings have been recently investigated by the authors [18,19]. It was found that the corrosion resistance of poly(vinyl chloride-co-vinyl acetate) coatings have been significantly improved with the addition of nano-silicates [19]. Aglan et al. [20] also found that the corrosion resistance of the same coating material was enhanced with the addition of multi-walled carbon nanotubes (MWCNTs). Other properties such as the strength of the coating were also investigated and were improved with the incorporation of MWCNTs. It was also shown that tailoring certain properties can be done by using MWCNTs and nano-silicates [21,22]. Hedia et al. [21] found that 1% MWCNT reinforcement epoxy nano-adhesive had increased ultimate and residual strength of about 29% and 56%, respectively, when compared to the neat epoxy system. Also, in comparison with the neat resin, there was a 265% increase in the fracture toughness of the MWCNT adhesive.

The adhesive strength of thermoplastic PIs filled with MWCNTs and aluminum nitride nano-powder has been studied [23-25]. The authors found that there was a gradual increase in the tensile strength and modulus of the PI carbon nanotubes composite as the nanotubes loadings increased from 0 to 1.5 wt % loading. They also found that the tensile breaking energy increased with increase in nanotube loading up to 0.5 wt %. These improved properties were made possible by obtaining good dispersion achieved by mixing low percentage weight of MWCNT through mechanical agitation and sonication for long hours. However, it must be mentioned that the aspect ratio of the nanotubes is reduced during the sonication, even though improved dispersion is obtained. Further results showed that the failure mode of the adhesive joints changed from a mixed mode (adhesive/cohesive) for the neat sample to mostly adhesive failure as the MWCNT loading increased [24].

Other researchers also developed nanostructured PI with various nanoparticles and studied the effects of the nanoparticles on their properties [26-33]. The effects of carbon nanotubes on the mechanical and electrical properties of PI nanocomposites were investigated [26]. It was reported that the strength of the PI increased with increasing loading of MWCNTs, while the strain to failure decreased, suggesting that the samples became more brittle with the addition of MWCNTs. Again the authors attributed this improvement in strength to the dispersion of the MWCNTs in the PI.

Processing conditions for nanostructured films include drying temperature and environment, method of dispersing the MWCNTs in the polymer systems, and method of fabricating the films. Additionally, the effects of various solvents on the mechanical performance of the films may be a concern in processing when solvents are used. Kobayashi et al. [34] studied the effect of thermal annealing on the conductivity of MWCNT-PI films prepared using an ultrasonic homogenizer and a spin coater. It was found that the resistance decreased with annealing. Various methods of dispersing MWCNTs into polymers have been explored over recent years [34, 35, 22], which include sonication, milling, surface modification of the MWCNTs to make them compatible with the polymer, melt processing, etc. It is therefore evident that processing conditions can greatly affect the mechanical performance of polymer films. The mechanical performance of the PI films in this work is characterized by ultimate strength, fracture resistance, and creep recovery. Creep recovery study is usually performed to investigate the deformation of a polymeric material with time because the strain of a viscoelastic material is time dependent. Creep strain is a barrier to some applications of thermoplastic polymers because the strain may accumulate and exceed the material's strain limit, leading to creep fracture. It is therefore important to study this property and ways of enhancing the creep resistance of the developed PI.

Thus, it is an aim of one or more inventions disclosed herein to provide methods for dispersing MWCNTs into PI that produce composite materials optimized to obtain maximum mechanical performance.

Additionally, it is an aim of one or more of the inventions disclosed herein to provide methods that utilize optimized processing conditions for neat and nanostructured PI films, including, for example, solvent selection, drying environment, and temperature.

Also, it is an aim of one or more of the inventions disclosed herein to provide improved methods for formulating films neat and nanostructured PI films.

Furthermore, it is an aim of one or more of the inventions disclosed herein to provide neat and nanostructured films characterized by improved strength, fracture resistance, and creep recovery.

SUMMARY OF THE INVENTION

To achieve the above-described and other aims, Applicants have developed films that utilize multi-walled carbon nanotubes ("MWCNTs") to enhance the mechanical performance, namely, strength, fracture resistance, and creep recovery of polyimide ("PI") films. Preferably, the loadings of MWCNTS can be in the range of 0.1 wt % to 0.5 wt %. Applicants also developed novel methods for dispersing MWCNTs in PI, and novel methods for fabricating PI films having optimal processing conditions. The mechanical performance of the optimized PI films developed by Applicants was evaluated by a series of experiments. Applicants found that the strength of the new PI films dried at 60° C. increased by 55% and 72% for 0.1 wt % MWCNT and 0.5 wt % MWCNT loadings, respectively, while the fracture resistance increased by 23% for the 0.1 wt % MWCNTs and then decreases at a loading of 0.5 wt % MWCNTs. The strength of the neat and nanostructured films increased after annealing. Additionally, Applicants also found that there is a corresponding shift in the annealing temperature at which the maximum strength occurs as the MWCNT loadings increase. The fracture resistance of all tested samples increased at an annealing temperature of 150° C. and then decreased as the temperature continued to increase up to 250° C. Creep recovery studies showed that the compliance of the PI films decreased with increasing MWCNT loading at room temperature and increases for all the samples as the testing temperature increases to 200° C. Also, the viscosity and percentage strain recovery of the samples increased with increasing MWCNT loading and decreased with increasing temperature. Generally, the percentage strain recovery is between 85%, for samples tested at high temperatures (200° C.), and 94%, for those tested at low temperatures (25° C.). Nanostructured PI films according to embodiments of the present invention may be produced by dry mixing and milling polyimide powder and unbundled multi-walled carbon nanotubes, where the weight percent of the nanotubes in the mixture is in the range of approximately 0.1 wt % to about 0.5 wt %. Preferably, this mixing is done with a high speed mixer. Milling thereafter is done with for sufficient time to break agglomerates of the nanotubes while at a low enough speed (500-1000 rpm) to keep the temperature low enough (preferably below 40 degree centigrade) to substantially prevent fracture of a significant amount of the nanotubes. Preferably, milling was done with highly crosslinked polystyrene beads at intervals to allow heat to disperse. Thereafter, the PI and MWCNT dry mixture are added to a solvent while mixing on the magnetic stirrer.

Suitable solvents include N-methylpyrrolidinone and tetrahydrofuran. Suitable PI polymers include those having a typical particle size of approximately 100 μm. A preferred polymer is Matrimid 9725. In certain embodiments the particle size ranges from about 50 to 150 μm. Information about particle size is provided by the suppliers.

The mixture is left to mix for a suitable time for later application to a substrate. Preferably, the annealing temperature is in the range of approximately 60° C. to approximately 150° C.

The various aspects and embodiments of the inventions herein having been thus described and summarize, preferred embodiments thereof will now be described in detail with reference to various drawings.

BRIEF DESCRIPTION OF THE DRAWINGS

FIG. 2A is a table reporting experimental results of the measured mechanical properties of neat versus nanostructured PI films prepared according to embodiments of the present invention.

FIG. 2B is a table reporting experimental results concerning the effect that a change in annealing temperature can have upon neat versus nanostructured PI films prepared according to embodiments of the present invention.

Figures 1A, 1B:
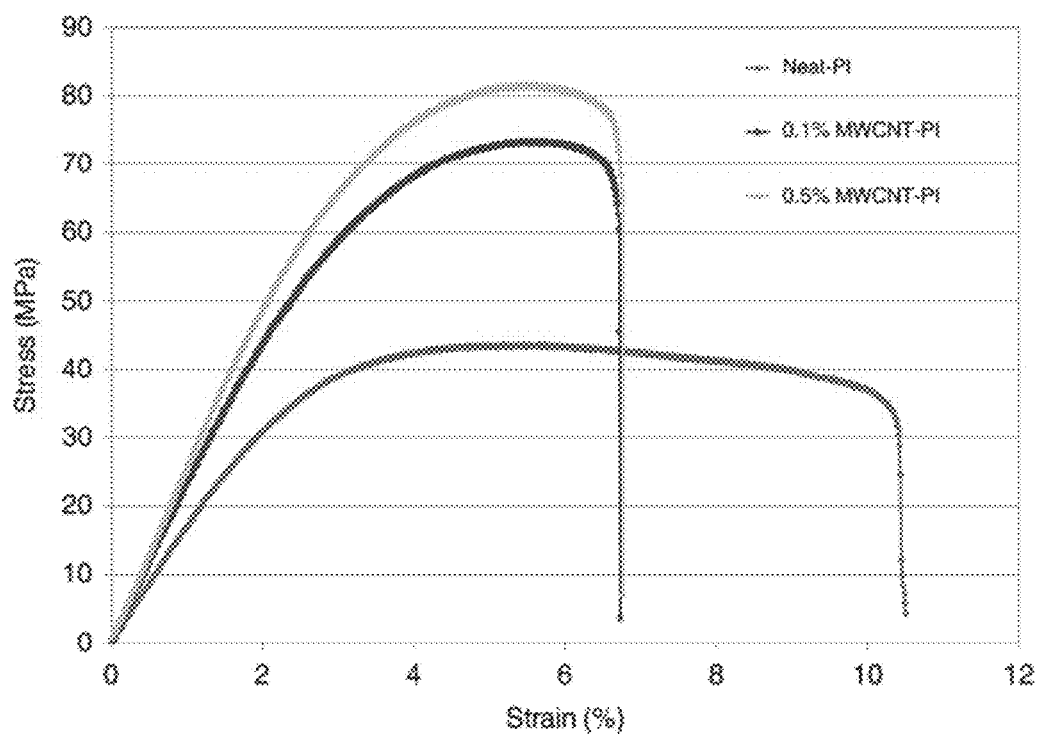
FIG. 1A is a table reporting experimental results concerning the effect of solvent choice on the strength of neat PI films.
FIG. 1B is a graph plotting experiment results regarding the stress-strain relationship of neat versus nanostructured PI films prepared according to embodiments of the present invention.

MWCNT nanostructured PI films according to embodiments of the invention as prepared in experiments described herein.

DETAILED DESCRIPTION OF THE PREFERRED EMBODIMENTS

Applicants have discovered that MWCNTs can be successfully dispersed in PI using different processing conditions to fabricate PIs and PI films having different strength, fracture resistance, and creep characteristics, as desired. In particular, Applicants have discovered that the strength of PI films dried at approximately 60° C. increase with the percentage loading of MWCNTs, and the fracture resistance initially increases with the addition of the 0.1 wt % MWCNTs and then thereafter decreases as the MWCNTs content is increased to 0.5 wt %. Further, Applicants have discovered that certain annealing conditions can cause an increase in the strength of the materials. In particular, the fracture resistance of the PI materials of Applicants' inventions increase at an annealing temperature of 150° C. and then decrease as the temperature continues to increase. Further, the addition of MWCNTs improve the fracture resistance at low temperatures but do not at high temperatures. Additionally, Applicants' inventions further rely upon the discovery that a shift occurs in the optimum annealing temperature when MWCNTs are added to PIs. In particular, the annealing temperature should be decreased as the loadings of MWCNTs is increased.

Applicants also have discovered via creep recovery testing that compliance of the PI films decreases with increasing MWCNT loading at room temperature, and increases for all the samples as the testing temperature increases up to 200° C. The viscosity and percentage strain recovery increases with increasing MWCNT loading, and decreases with increasing temperature. Generally, the percentage strain recovery is between 85%, for samples tested at high temperatures (200° C.), and 94%, for those tested at low temperatures (25° C.).

Applicants will now describe particular preferred embodiments of the invention with particular references to various laboratory experiments that were conducted on various PI compositions. The particular PI used in these various experiments was Matrimid 9725, obtained from Huntsman Corporation. This particular PI is fully imidized during manufacturing and therefore does not require high processing temperatures. Matrimid is also soluble in a variety of solvents and can form strong durable films with good chemical resistance and thermal properties. Seventy to one hundred percent of the powder has a typical particle size of less than 106 μm. The glass transition temperature ("Tg") of the dry and wet films found by dynamic mechanical analysis ("DMA") is 280° C. and 265° C., respectively [36].

The MWCNTs were obtained from Ahwahnee Technology, Inc. The MWCNTs had diameters of 10-50 nm, purity greater than 95%, and are unbundled.

The various neat PI films used in the experiments described herein were developed by dissolving the PI in a suitable solvent. In the experiments herein, N-methylpyrrolidinone (NMP) and tetrahydrofuran (THF) were used as solvents. The polymer, Matrimid 9725, was dissolved in the solvent by mechanically stirring on a magnetic stirrer. The mixture was left to mix for approximately 24 hours after which samples were spin coated onto a 6 in. diameter glass substrate. The glass substrate containing the PI solution was then placed in a vacuum oven at 30 inHg vacuum and approximately 60° C. for 24 hours to dry. Films of uniform thicknesses were obtained with thickness range of about 50-100 μm.

Nanostructured PI films having MWCNTs were likewise developed with loadings of 0.1 wt % and 0.5 wt % for comparison with neat films. To prepare loaded films, first the nanotubes were dry mixed and milled with the PI powder in a high-speed shear mixer at about 3500 rpm. The milling was done with highly cross-linked polystyrene beads. The dry mixture was milled for a total time of 6 min, in 30-s intervals, to allow for the dissipation of heat generated by the beads. The milling was done to ensure proper distribution of the nanotubes in the polymer by breaking agglomerates of the nanotubes. In a similar manner to the neat PI solution, the PI and MWCNT dry mixture was then added to the solvent while mixing on the magnetic stirrer. The rest of the procedure for preparing the nanostructured films was the same as previously mentioned for the neat PI films. Once fabricated, the various films were mechanically tested for strength and fracture resistance as follows.

The strength and fracture resistance of each of the PI films as formed above were evaluated by tensile testing of samples cut from the films with a die according to ASTM D-412-C-IMP. The tensile test was done on a Sintec 5D material testing system at a crosshead speed of 2.54 mm/min. Special grips manufactured by MTS corporation for testing films were used to grip the PI samples. The fracture resistance was obtained by testing samples containing a 1.5 mm notch. The fracture resistance, K1, was used mainly for ranking the materials because the fracture toughness is not valid for thin specimens such as films. The value of K1 is calculated as follows in Eq. 1:

$$K_1 = \sigma\sqrt{\pi a} \cdot F_1(\alpha), \quad \alpha = \left(\frac{\alpha}{\omega}\right) \tag{Eq. 1}$$

where σ is the maximum residual stress, α is the crack length, ω is the specimen width, and the geometrical correction factor $F_1(\alpha)$ is given as follows in Eq. 2:

$$F_1(\alpha) = 1.12 - 0.231\alpha + 10.55\alpha^2 - 21.72\alpha^3 + 30.39\alpha^4 \tag{Eq. 2}$$

The creep and recovery study of the PI samples were done on a DMA Q800 TA instrument. The samples were tested in tension mode using a rectangular cross section of 6.38×15 mm² and a thickness range of 0.05-0.08 mm. The creep was done with a preload force of 0.01 N under a stress of 30 MPa. They were kept at this stress for 15 minutes after which they are allowed to recover for 30 minutes. The experiment was performed at three temperatures, 25° C., 100° C., and 200° C. From the creep experiment, the creep performance is represented by the creep compliance J(t), which is defined as the ratio of the creep strain to the applied stress, that is, $$(t) = \frac{\varepsilon(t)}{\sigma} \tag{Eq. 3}$$

Other properties of the material, obtained from the experiments, are the percent strain recovery, strain rate, and the zero-shear viscosity. The equations that are used to model the creep strain and compliance behavior of thermoplastics polymers are Findley power law. The strain is represented by the following Eq. 4:

$$\epsilon(t) = \epsilon_0 + At^n \tag{Eq. 4}$$

where $\in(t)$ is the strain rate at time t, $\in_0$ is the instantaneous initial strain, A is the amplitude, and n is the time exponent.

The compliance is represented by the following Eq. 5:

$$J(t) = J_0 + J_1 t^n \tag{Eq. 5}$$

where $J_0$ is the time-dependent compliance, JI is the coefficient of the time-dependent term, and n is a constant, which is usually lower than one. Unlike creep strain and strain rate, the compliance is normalized by the applied stress and, therefore, makes it possible to compare other creep data from different tests performed at different stress levels.

With these relationships in mind, the effect of solvents on the mechanical performance of the PI films was examined to determine the most suitable solvent for developing the films. Two solvents were selected by Applicants, THF and NMP. NMP was chosen because it has a higher boiling point (205° C.) than THF (66° C.) and in theory should dry slower, producing a more even drying of the films. Samples were prepared with 100% THF, 100% NMP, and 50% THF/50% NMP. Visual observations showed that the 100% NMP samples took a longer time to dry than the other compositions, due to the high boiling point of NMP, and the films were more flexible than those made with THF. In addition, the THF samples were wrinkled due to the fast drying caused by the low boiling point of THF. The samples were evaluated by performing mechanical tests in tensile mode to obtain their strength. The table depicted in FIG. 1A shows a summary of the effects of solvents on the mechanical performance of the films. The strength of the 100% NMP sample was the highest about 91 Mpa while that of the 100% THF was about 50 MPa. The strength of the 50% THF/50% NMP sample was only about 21 MPa. In addition, the 100% THF sample was more brittle than the 100% NMP sample. The strain to failure of the 100% NMP was found to be about 10.5% while that of the 100% THF was only 5.5%. The 50/50% sample had a strain to failure of about 8%. It is clear from Table 1 that the samples prepared with NMP produced films with optimum properties. All other samples were then prepared using NMP as solvent.

Applicants also conducted experiments determine the effect of nano-reinforcement on the strength and fracture resistance of PI films, and the determined stress-strain relationship of the neat and nanostructured PI films is represented by the data plot shown in FIG. 1B. The strength of the neat film is about 44 MPa while that of the 0.1% MWCNT and 0.5% MWCNT is about 73 and 82 MPa, respectively. This is an increase over the neat PI sample of about 55% and 72%, respectively, for the 0.1% MWCNT and 0.5% MWCNT samples. It is also clear that the strain to failure is reduced with the addition of MWCNTs. The increased stress and reduced strain as the MWCNTs loading increased can be partly attributed to the large surface area of the MWCNTs and the excellent dispersion of the MWCNTs in the PI, thus reducing the free volume in the material. It is rationalized that when heat is generated through milling, active sites are created on the polymer and the MWCNTs attached themselves to the polymer, thus enhancing the dispersion.

A summary of the strength and fracture resistance of the PI films is shown in table of FIG. 2A. The fracture resistance of the neat PI sample was 3.05 MPa√m while that of the 0.1% MWCNT sample increased to 3.75 MPa√m. This is an improvement of about 23% in the resistance of the material to crack propagation. The fracture resistance of the 0.5% MWCNT sample (3.66 Mpa√m) was not significantly different from the 0.1% MWCNT sample. In order to further optimize the processing conditions of the PI films, Applicants conducted an annealing study on the films. This was done to ensure that all the solvent was removed from the films, as well as to study the effect of heat treatment on the mechanical performance of the films. The samples were heated at four different temperatures, 60° C., 150° C., 210° C., and 250° C., for a period of 24 hours. The tensile strength and fracture resistance of all the samples were tested. The table of FIG. 2A shows a summary of the mechanical performance of the films annealed at different temperatures. It is clear that the strength of both neat and nanostructured films increased after annealing. The neat films annealed at 210° C. showed a reduction in the strain from those annealed at 60° C. This is because as the temperature increases, it dries the film and locks the polymer chains together, restricting molecular motion. Also, the presence of solvent in the films would act as a plasticizer, making the films more flexible. The nanostructured films showed no significant change in the strain to failure with increased annealing temperature. However, it is noticed that the samples annealed at 150° C. had the largest strain to failure. This is because the boiling point of NMP is 205° C.; thus, at this temperature, there is still residual solvent in the sample but not as much as those annealed at 60° C. Furthermore, the strength of the materials annealed at 150° C. has increased over that annealed at 60° C., giving the material more time for extending without failure, whereas above 205° C., majority of the solvent is driven off and the strength increased further but there is decreased strain.

A similar trend to the neat samples is seen for the 0.1% MWCNT sample; there is an increase in the strength of the films as the annealing temperature increases. However, it is observed that there is a shift in the annealing temperature at which the maximum strength occurs for the nanostructured samples due to the increase loading of the MWCNTs. The 0.1% MWCNT sample showed the highest strength at 210° C. Again, the strain to failure of the 0.1% MWCNT increased at an annealing temperature of 150° C. and then decreased as the temperature further increases. A similar behavior was seen for the 0.5% MWCNT samples shown in FIG. 2B. It is also seen that the highest strength occurs at an annealing temperature of 150° C., confirming the shift in annealing temperature as the loading of MWCNT increased. This shift in annealing temperature may be due to the presence of the MWCNTs, which have very high thermal conductivity, thus transferring heat throughout the films more efficiently. The fracture resistance of the samples is also presented in FIG. 2B. In general, it is seen that the fracture resistance for both the neat and nanostructured samples increased at an annealing temperature of 150° C. and then decreased at higher temperatures. The increase in fracture resistance correlates with the increase in strain to failure for the nanostructured samples discussed above. It is believed that the nanotubes create resistance to the tear propagation of the films and thus increase the fracture resistance. However, at higher temperatures, the materials became more rigid and the fracture resistance and strain to failure reduced. Also seen in FIG. 2B, is that at 150° C. and 210° C., the neat material had the highest fracture resistance of all three formulations, while at 25° C., there was no significant change between the neat and the 0.1% MWCNT sample. It can be concluded that even though the MWCNTs improved the fracture toughness of the PI material when annealed at low temperatures (60° C.), it did not at higher temperatures.

Thereafter, Applicants conducted experiments to determine the creep performance of the various PI films. Before performing the creep study, the samples were conditioned for 24 hours at the temperature at which they showed the highest strength in the annealing study. Thus, the neat, 0.1% MWCNT, and 0.5% MWCNT films were conditioned at 250° C., 210° C., and 150° C., respectively. The creep experiment was performed at three temperatures, 25° C., 100° C., and 200° C.

Figure 2C:
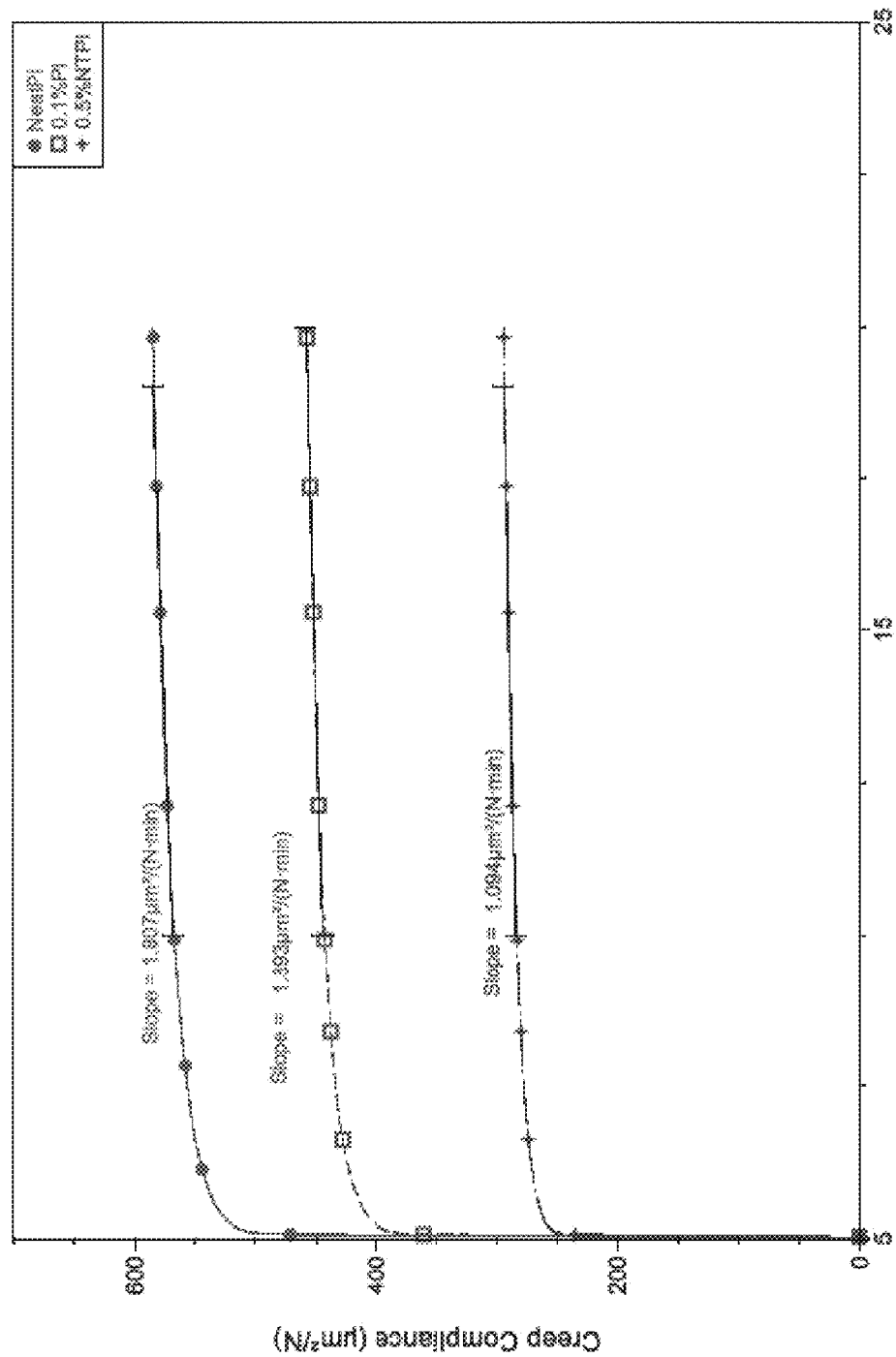
FIG. 2C is a graph plotting experiment results regarding the creep compliance at 25° C. of neat versus nanostructured PI films prepared according to embodiments of the present invention.
Figures 3A, 3B:
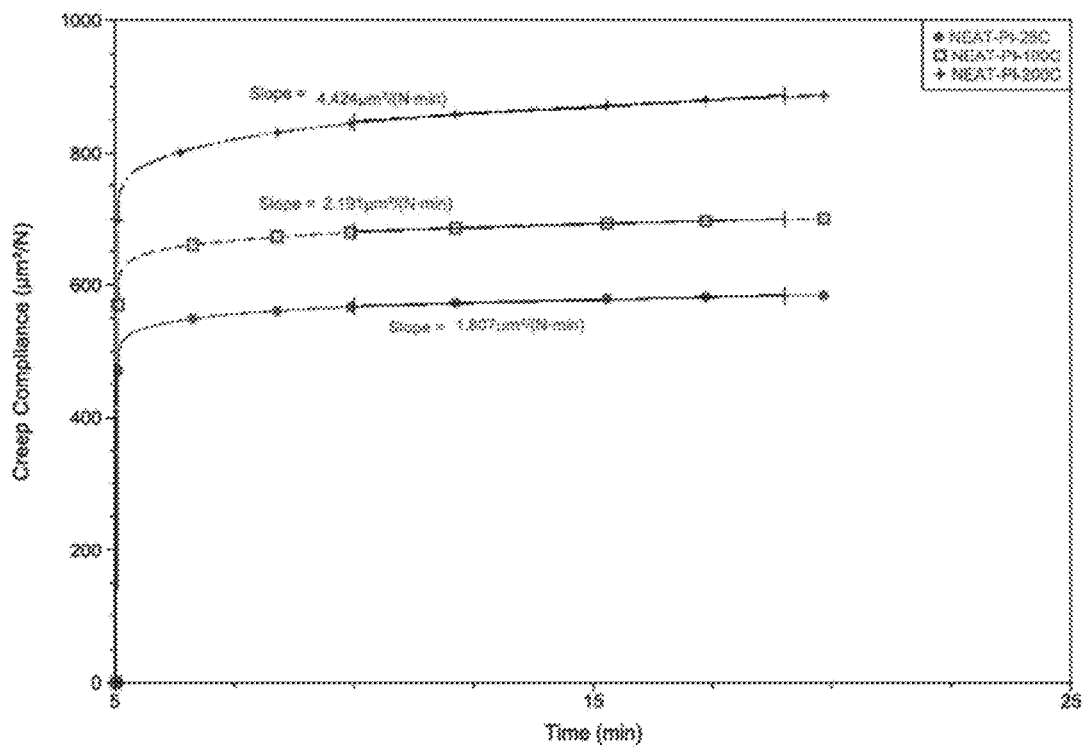
FIG. 3A is a table reporting experimental results of the measured creep properties of neat versus nanostructured PI films prepared according to embodiments of the present invention.
FIG. 3B is a graph plotting experiment results regarding the creep compliance at various temperatures of neat PI films as prepared in experiments described herein.

The compliance versus time plot of the neat and nanostructured PI films obtained from the creep experiment performed at 25° C. is shown in FIG. 2C. It is seen that the compliance of the films decreased with the addition of MWCNTs, suggesting that the creep strain decreased because the applied stress is constant. This data correlates well with thermal study on the PI films where the molecular chains of the PI are restricted with the addition of nanoparticles [18], hence reducing the creep compliance (increased creep resistance). Also shown in FIG. 2C is the slope of the creep compliance curve, which is used to find the zero-shear viscosity of the materials. These values are shown in the table of FIG. 3A. It can be seen therein that the shear viscosity of the PI films increased with the addition of MWCNTs. This result also correlates with the mechanical properties and the thermal properties previously studied [18].

In addition to the tests performed at 25° C., creep tests were also conducted at 100° C. and 200° C. to evaluate the performance of the PI material at elevated temperatures but below its Tg. The creep compliance of the neat PI as a function of time at all three temperatures is shown in FIG. 3B. It is clear that the creep compliance increases with temperature because the molecular mobility of the polymer chains will increase as more energy is added through heating. The compliance at the end of the test (20 minutes on curve) of the neat PI at 25° C. was 585 $\mu m^2/N$, while the ones tested at 1008 C and 2008 C was 700 and 887 $\mu m^2/N$, respectively.

Figure 4:
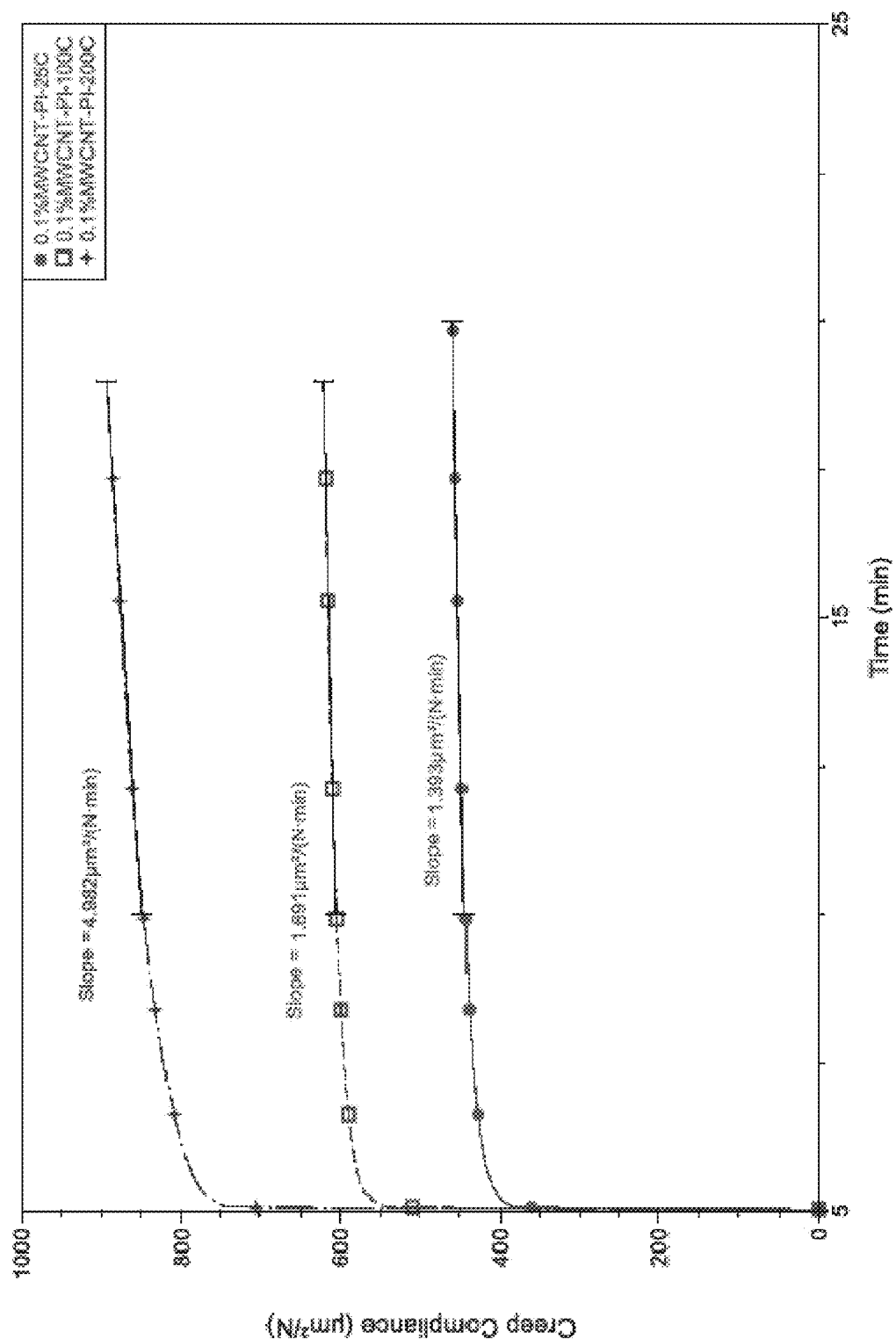
FIG. 4 is a graph plotting experiment results regarding the creep compliance at various temperatures of 0.1 wt % MWCNT nanostructured PI films according to embodiments of the invention as prepared in experiments described herein.
Figure 5:
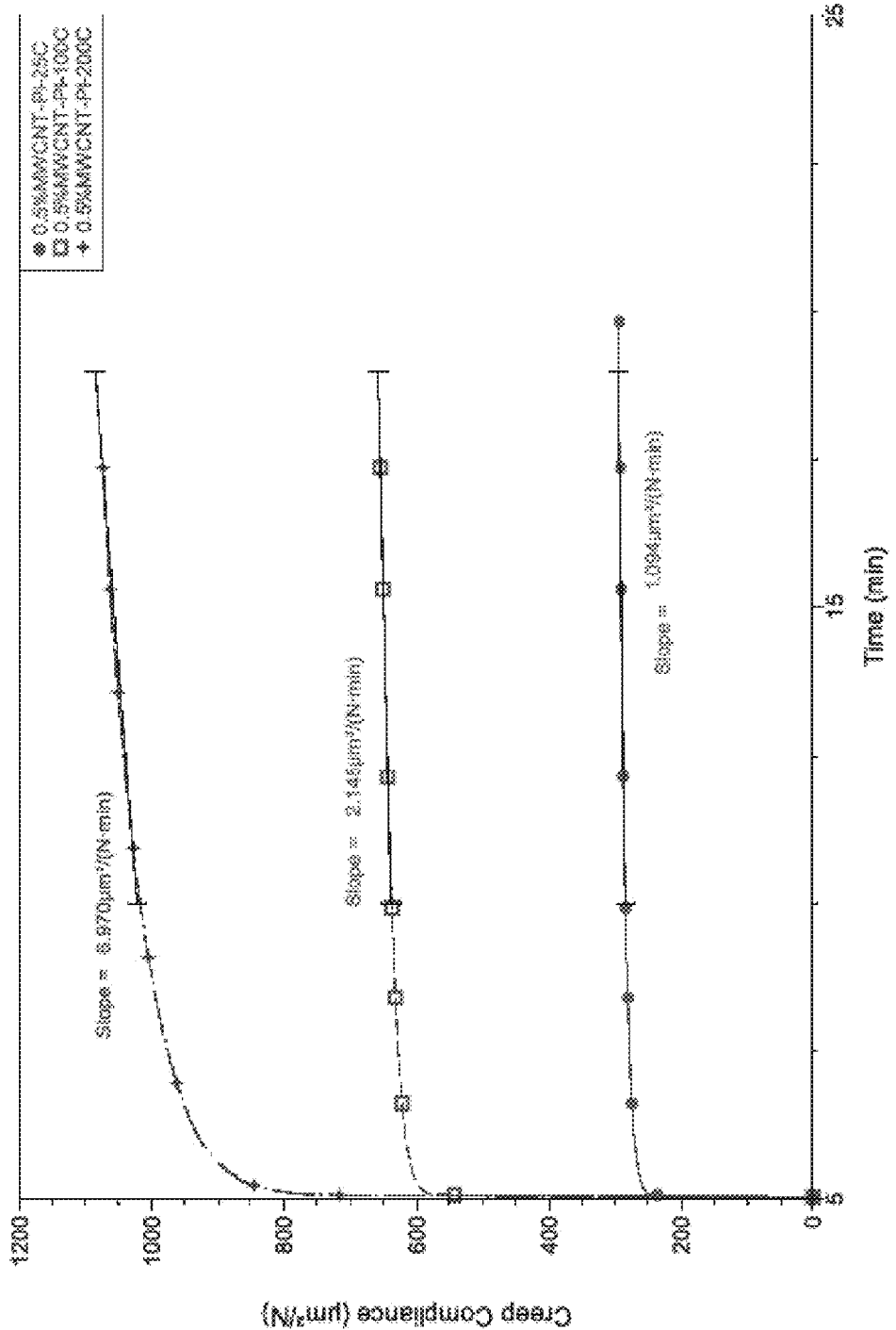
FIG. 5 is a graph plotting experiment results regarding the creep compliance at various temperatures of 0.5 wt %

A similar behavior was observed for the 0.1% MWCNT and 0.5% MWCNT samples with increasing testing temperature as shown in FIGS. 4 and 5, respectively. The compliances of the 0.1% MWCNT films tested at 25° C., 100° C., and 200° C. was found to be 455, 618, and 885 $\mu m^2/N$, respectively. The compliances of the 0.5% MWCNT films are found to be 295, 655, and 1073 $\mu m^2/N$, respectively. Also, it is observed from FIG. 3B, FIG. 4, and FIG. 5 that up to 100° C., the compliance of the nanostructured samples is less than the neat material. However, at 200° C., the compliances of the nanostructured samples are higher than the neat material. This shows that even though the MWCNTs decreased the compliance of the PI material at room temperature, the opposite is true as the temperature increases and gets closer to the Tg of the material. This may be because the MWCNTs are very good thermal conductors, having the highest thermal conductivity of all known materials, thus conducting the heat throughout the samples and making them more compliant. It also confirms the shift in the annealing temperature of the nanostructured samples.

In addition to the creep compliance, the dimensional stability of the PI films is also described by another important parameter, the strain rate. The strain rate is defined as the velocity of the creep deformation and is found from the slope of the strain versus time curve. These values are also shown in the table of FIG. 3A. There is a clear decrease in the strain rate as the loading of the MWCNTs increased. This is because the MWCNTs restrict molecular motion, thus slowing the strain rate. Additionally, the strain rate of both neat and nanostructured samples increased with increase in temperature.

The viscosities of all the samples tested at all three temperatures are also shown in FIG. 3A. It is seen that the viscosity of all the samples decreases with increase in testing temperature, suggesting that the resistance of the material to flow has decreased. Again, this is due to the increased molecular mobility caused by the increased energy from the high testing temperature. The table of FIG. 3A also contains the average percentage strain recoverable. This information is important to understand how elastic each of the developed materials is. It is seen that the percentage strain recoverable for the samples tested at 25° C. increased as the amount of nanoparticles increases. This suggests that the material became more elastic with the addition of the nanoparticles. However, as the testing temperature increases, the percentage strain recoverable decreased for both neat and nanostructured samples, even though the relationship is not linear.

Thus, the above experiments established that films containing MWCNTs to enhance the mechanical performance having loadings of MWCNTs in the range of 0.1 wt % to 0.5 wt % can be prepared to maximize their characteristics. Specifically, the strength of the new PI films dried at 60° C. increased by 55% and 72% for 0.1 wt % MWCNT and 0.5 wt % MWCNT loadings, respectively, while the fracture resistance increased by 23% for the 0.1 wt % MWCNTs and then decreases at a loading of 0.5 wt % MWCNTs. The strength of the neat and nanostructured films increased after annealing. Additionally, Applicants also found that there is a corresponding shift in the annealing temperature at which the maximum strength occurs as the MWCNT loadings increase. The fracture resistance of all tested samples increased at an annealing temperature of 150° C. and then decreased as the temperature continued to increase up to 250° C. Creep recovery studies showed that the compliance of the PI films decreased with increasing MWCNT loading at room temperature and increases for all the samples as the testing temperature increases to 200° C. Also, the viscosity and percentage strain recovery of the samples increased with increasing MWCNT loading and decreased with increasing temperature. Generally, the percentage strain recovery is between 85%, for samples tested at high temperatures (200° C.), and 94%, for those tested at low temperatures (25° C.).

The preferred embodiments having thus been described, those skilled in the art will readily appreciate that various modifications and variations can be made to the above described preferred embodiments without departing from the spirit and scope of the invention. The invention thus will only be limited to the claims as ultimately granted.

REFERENCES CITED

1. Polyimides. Available at: http://pslc.ws/macrog/imide.htm (accessed Apr. 23, 2007).
2. Fang, X., Yang, Z., Zhang, S., Gao, L. and Ding, M. (2004). Synthesis and Properties of Polyimides Derived from cis and trans-1,2,3,4-cyclohexanetetracarboxylic Dianhydrides, Polymer, 45: 2539-2549.
3. Seino, H., Haba, O., Ueda, M. and Mochizuki, A. (1999). Photosensitive Polyimide-Precursor Based on Polyisoimide: Dimensionally Stable Polyimide with a Low Dielectric Constant, Polymer, 40: 551-558.
4. HD MicroSystems™. Available at: http://www.hdmicrosystems.com/tech/polyimid.html (accessed Apr. 20, 2007).
5. Azo materials—The A to Z of Materials. Available at: http://www.azom.com/details.asp?ArticleID1/4674 (accessed Apr. 20, 2007).
6. Li, T. L. and Chung Hsu, S. L. (2007). Preparation and Properties of a High Temperature, Flexible and Colorless ITO Coated Polyimide Substrate, Eur. Polym. J., 43: 3368-3373.
7. DuPont Automotive. Available at: http://plastics.dupont.com/plastics/pdflit/europe/markets/autoee.pdf (accessed Apr. 20, 2007).
8. Herrero, J. and Guillen, C. (2002). Transparent Films on Polymers for Photovoltaic Applications, Vacuum, 67: 611-616.
9. Otte, K., Makhova, L., Braun, A. and Konovalov, I. (2006). Flexible Cu(In, Ga)Se2 Thin-film Solar Cells for Space Application, Thin Solid Films, 511-512: 613-622.

10. Mathew, X., Enriquez, J., Romeo, A. and Tiwari, A. (2004). CdTe/CdS Solar Cells on Flexible Substrates, Sol. Energy, 77: 831-838.
11. Khrypunov, G., Romeo, A., Kurdesau, F., Batzner, D. L., Zogg, H. and Tiwari, A. N. (2006). Solar Energy Materials and Solar Cells, Sol. Energy Mater. Sol Cells, 90: 664-677.
12. Guillen, C. and Herrero, J. (2003). Electrical Contacts on Polyimide Substrates for Flexible Thin Film Photovoltaic Devices, Thin Solid Films, 431-432: 403-406.
13. Bonnet, D. (2000). Manufacturing of CSS CdTe Solar Cells, Thin Solid Films, 361-362: 547-552.
14. Romeo, A., Khrypunov, G., Kurdesau, F., Arnold, M., Batzner, D. L., Zogg, H. et al. (2006). High-efficiency Flexible CdTe Solar Cells on Polymer Substrates, Sol. Energy Mater. Sol Cells, 90: 3407-3415.
15. Tiwari, A. N., Krejci, M., Haug, F. J. and Zogg, H. (1999). 12.8% Efficiency Cu(In, Ga)Se2 Solar Cell on a Flexible Polymer Sheet, Prog. Photovoltaics: Res. Appl., 7: 393-397.
16. Moriarty, P. (2001). Nanostructured Materials, Rep. Prog. Phys., 64: 297-381.
17. Ryan, K. P., Cadek, M., Nicolosi, V., Blond, D., Ruether, M., Armstrong, G. et al. (2007). Carbon Nanotubes for Reinforcement of Plastics? A Case Study with Poly(Vinyl Alcohol), Compos. Sci. Technol., 67: 1640-1649.
18. Allie, L. (2009). Formulation and Characterization of Nanostructured Polymeric Systems for High Performance Applications, PhD Dissertation, Tuskegee University.
19. Allie, L., Thorn, J. and Aglan, H. (2008). Evaluation of Nanosilicate Filled Poly(Vinyl Chloride-co-Vinyl Acetate) and Epoxy Coatings, Corros. Sci., 50: 2189-2196.
20. Aglan, A., Allie, A., Ludwick, A. and Koons, L. (2007). Formulation and Evaluation of Nano-structured Polymeric Coatings for Corrosion Protection, Surf. Coat. Technol., 202: 370-378.
21. Hedia, H. S., Allie, L., Ganguli, S. and Aglan, H. (2006). The influence of Nanoadhesives on the Tensile Properties and Mode-I Fracture Toughness of Bonded Joints, Eng. Fract. Mech., 73: 1826-1832.
22. Ganguli, S. (2005). Synthesis and Characterization of Nanostructured Polymer Composites, PhD Dissertation, Tuskegee University.
23. Saeed, M. B. and Zhan, M. S. (2007). Adhesive Strength of Partially Imidized Thermoplastic Polyimide Films in Bonded Joints, Int. J. Adhes. Adhes., 27: 9-19.
24. Saeed, M. B. and Zhan, M. S. (2007). Adhesive Strength of Nano-Size Particles Filled Thermoplastic Polyimides. Part-I: Multi-walled Carbon Nano-Tubes (MWNT)-Polyimide Composite Films, Int. J. Adhes. Adhes., 27: 306-318.
25. Saeed, M. B. and Zhan, M. S. (2007). Adhesive Strength of Nano-Size Particles Filled Thermoplastic Polyimides. Part-II: Aluminum Nitride (AlN) Nano-Powder-Polyimide Composite films, Int. J. Adhes. Adhes., 27: 319-329.
26. So, H. H., Cho, J. W. and Sahoo, N. G. (2007). Effect of Carbon Nanotubes on Mechanical and Electrical Properties of Polyimide/Carbon Nanotubes Nanocomposites, Eur. Polym. J., 43: 3750-3756.
27. Zhang, Y., Wu, J., Fu, S., Yang, S., Li, Y., Fan, L. et al. (2004). Studies on Characterization and Cryogenic Mechanical Properties of Polyimide-layered Silicate Nanocomposite Films, Polymer, 45: 7579-7587.
28. Zhang, Y., Li, Y., Fu, S., Xin, J. H., Daoud, W. A. and Li, L. (2005). Synthesis and Cryogenic Properties of Polyimide-Silica Hybrid Films by Sol-Gel Process, Polymer, 46: 8373-8378.
29. Delozier, D. M., Orwoll, R. A., Cahoon, J. F., Johnston, N. J., Smith Jr, J. G. and Connell, J. W. (2002). Preparation and Characterization of Polyimide/Organoclay Nanocomposites, Polymer, 43: 813-822.
30. Li, B., He, T. and Ding, M. (1998). Optical Properties of Organo-soluble Polyimide Thin Films and their Applications in Liquid Crystal Displays, Thin Solid Films, 320: 280-284.
31. Tsai, M., Liu, S. and Chiang, P. (2006). Synthesis and Characteristics of Polyimide/Titania Nano Hybrid Films, Thin Solid Films, 515: 1126-1131.
32. Qiu, F., Zhou, Y., Liu, J. and Zhang, X. (2006). Preparation, Morphological and Thermal Stability of Polyimide/Silica Hybrid Material Containing Dye NBDPA, Dyes Pigm., 71: 37-42.
33. Lai, S., Li, T., Wang, F., Li, X. and Yue, L. (2007). The Effect of Silica Size on the Friction and Wear Behaviors of Polyimide/Silica Hybrids by Sol-Gel Processing, Wear, 262: 1048-1055.
34. Kobayashi, T., Hirao, H., Suzuki, A., Terai, T. and Meguro, T. (2009). Ion Beam Irradiation and Annealing Effects on Carbon Nanotube Dispersed Polyimide Thin Films, Surf. Coat. Technol., 203: 2472-2475.
35. Siochi, E. J., Working, D. C., Park, C., Lillehei, P. T., Rouse, J. H., Topping, C. C. et al. (2004). Melt Processing of SWCNT-Polyimide Nanocomposite Fibers, Composites: Part B, 35: 439-446.
36. Matrimid®. Matrimid 9725 Data Sheet, New York, Huntsman Advanced Materials Americas Inc.

The invention claimed is:
1. A method of forming a polyimide (PI) polymer/multi-walled carbon nanotube (MWCNT) film comprising the following steps:
   a) dry mixing PI powder with unbundled multi-walled carbon nanotubes (MWCNT) using a high-speed shear mixer at about 3500 rpm; wherein the MWCNT is presented at about 0.1 percent to about 0.5 weight percent, and wherein the PI has an average particle size of about 100 µm; wherein the PI polymer comprises Matrimid® 9725;
   b) milling the mixture from step a) with cross-linked polystyrene beads in intervals of time to allow for heat dissipation generated by the beads; wherein the milling is performed for about 6 minutes in 30 second intervals;
   c) adding the mixture from step b) to a solvent, selected from N-methylpyrrolidinone (NMP) or tetrahydrofuran (THF) or mixtures thereof, while stirring; wherein the stirring is performed for about 24 hours;
   d) spin coating the mixture from step c) and
   e) annealing the mixture by placing in a vacuum oven to dry at a temperature from about 60° C. to about 250° C. to form the PI/MWCNT film; wherein the annealing occurs in a 30 inHG vacuum at about 60° C. to about 150° C. for about 24 hours.

* * * * *